United States Patent
Shi et al.

(10) Patent No.: US 11,651,198 B2
(45) Date of Patent: May 16, 2023

(54) DATA PROCESSING METHOD AND APPARATUS FOR NEURAL NETWORK

(71) Applicant: Beijing Baidu Netcom Science and Technology Co., Ltd., Beijing (CN)

(72) Inventors: Jiaxin Shi, Beijing (CN); Huimin Li, Beijing (CN); Yong Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 986 days.

(21) Appl. No.: 16/502,687

(22) Filed: Jul. 3, 2019

(65) Prior Publication Data

US 2020/0050924 A1    Feb. 13, 2020

(30) Foreign Application Priority Data

Aug. 10, 2018 (CN) .......................... 201810906496.7

(51) Int. Cl.
*G06N 3/048* (2023.01)
*G06N 3/08* (2006.01)
*G06F 7/483* (2006.01)

(52) U.S. Cl.
CPC ............. *G06N 3/048* (2023.01); *G06F 7/483* (2013.01); *G06N 3/08* (2013.01)

(58) Field of Classification Search
CPC .............................. G06N 3/0481; G06F 7/483
USPC .......................................................... 706/22
See application file for complete search history.

(56) References Cited

U.S. PATENT DOCUMENTS

| | | | |
|---|---|---|---|
| 10,223,635 | B2 | 3/2019 | Annapureddy et al. |
| 2016/0179434 | A1 | 6/2016 | Herrero Abellanas et al. |
| 2019/0042922 | A1* | 2/2019 | Pillai ....................... G06F 17/17 |
| 2019/0114555 | A1* | 4/2019 | Akerib ................ G06N 3/0445 |
| 2019/0272310 | A1 | 9/2019 | Sakaguchi |

(Continued)

FOREIGN PATENT DOCUMENTS

| | | |
|---|---|---|
| JP | 200367182 A | 3/2003 |
| JP | 201892294 A | 6/2018 |
| KR | 1020170106338 A | 9/2017 |

OTHER PUBLICATIONS

Raschka, "Python machine learning programming on the first revised Python Machine Learning intruder and a practice impress top gear", Python Machine Learning Programming First Edition Python Machine Learning, 2017, 6 pages. (Relevant for the reasons noted in the English-language translation of the JP Office Action).

*Primary Examiner* — Suchin Parihar
(74) *Attorney, Agent, or Firm* — The Webb Law Firm (57) ABSTRACT

Embodiments of the present disclosure relate to a data processing method and apparatus for a neural network. The neural network is provided with at least one activation function. A method may include: converting, in response to that an activation function acquiring current data is a target function, based on a conversion relationship between the target function and a preset function, the current data into input data of the preset function; finding out first output data of the preset function with the input data as an input in a lookup table corresponding to the preset function; obtaining second output data of the target function with the current data as an input by conversion based on the conversion relationship and the first output data; and outputting the second output data.

19 Claims, 5 Drawing Sheets

(56) References Cited

U.S. PATENT DOCUMENTS

| | | | | |
|---|---|---|---|---|
| 2019/0340492 A1* | 11/2019 | Burger | ............... | G06N 3/08 |
| 2020/0264876 A1* | 8/2020 | Lo | ............... | G06K 9/6262 |
| 2021/0150663 A1* | 5/2021 | Maiyuran | ............... | G06N 5/04 |
| 2022/0051467 A1* | 2/2022 | Woop | ............... | G06F 9/5016 |
| 2022/0051476 A1* | 2/2022 | Woop | ............... | G06F 9/5016 |

* cited by examiner

DATA PROCESSING METHOD AND APPARATUS FOR NEURAL NETWORK

CROSS-REFERENCE TO RELATED APPLICATION

This application claims priority to Chinese Patent Application No. 201810906496.7 filed Aug. 10, 2018, the disclosure of which is hereby incorporated by reference in its entirety.

TECHNICAL FIELD

Embodiments of the present disclosure relate to the field of artificial intelligence technology, and particularly to a data processing method and apparatus for a neural network.

BACKGROUND

The artificial neural network (ANN)) is a mathematical model of an algorithm of imitating neural network behavior characteristics of animals for distributed parallel information processing, and is generally referred to as a neural network or artificial neural network.

The neural network is a computation model composed of a large number of nodes (or neurons) by mutual connection. Each of the nodes represents a particular output function known as an activation function. The connection between every two nodes represents a weighted value (known as a weight) of a signal of the connection, and is equivalent to memory of the artificial neural network. The network output varies with the network connection type, the weight value, and the activation function.

SUMMARY

Embodiments of the present disclosure present a data processing method and apparatus for a neural network.

In a first aspect, an embodiment of the present disclosure presents a data processing method for a neural network, the neural network provided with at least one activation function. The method includes: converting, in response to that an activation function acquiring current data is a target function, based on a conversion relationship between the target function and a preset function, the current data into input data of the preset function; finding out first output data of the preset function with the input data as an input in a lookup table corresponding to the preset function; obtaining second output data of the target function with the current data as an input by conversion based on the conversion relationship and the first output data; and outputting the second output data.

In some embodiments, the target function includes a sigmoid nonlinear function, and the preset function includes a tank hyperbolic tangent function; and the converting, based on a conversion relationship between the target function and a preset function, the current data into input data of the preset function includes: determining a quotient of dividing the current data by two for use as the input data of the preset function.

In some embodiments, if the current data is a floating number, and the floating number takes an expression including a mantissa and an exponent with two as a base, then the determining a quotient of dividing the current data by two includes: subtracting one from the exponent of the current data to obtain the quotient of dividing the current data by two.

In some embodiments, the obtaining second output data of the target function with the current data as an input by conversion based on the conversion relationship and the first output data includes: summing the first output data and one, and determining a quotient of dividing the sum by two for use as the second output data of the target function with the current data as the input.

In some embodiments, if the sum is a floating number, and the floating number takes an expression including a mantissa and an exponent with two as a base, then the determining a quotient of dividing the sum by two comprises: subtracting one from the exponent of the sum to obtain the quotient of dividing the sum by two.

In some embodiments, the lookup table corresponding to the preset function includes at least one of a positive number input range or a negative number input range.

In some embodiments, the target function includes a tank hyperbolic tangent function, and the preset function includes a sigmoid nonlinear function; and the converting, based on a conversion relationship between the target function and a preset function, the current data into input data of the preset function includes: determining a product of multiplying the current data by two for use as the input data of the preset function.

In some embodiments, if the current data is a floating number, and the floating number takes an expression including a mantissa and an exponent with two as a base, then the determining a product of multiplying the current data by two includes: adding one to the exponent of the current data to obtain the product of multiplying the current data by two.

In some embodiments, the obtaining second output data of the target function with the current data as an input by conversion based on the conversion relationship and the first output data comprises: determining a product of multiplying the first output data by two, and using a difference of subtracting one from the product as the second output data of the target function with the current data as the input.

In some embodiments, if the first output data is a floating number, and the floating number takes an expression including a mantissa and an exponent with two as a base, then the determining a product of multiplying the first output data by two includes: adding one to the exponent of the first output data to obtain the product of multiplying the first output data by two.

In a second aspect, an embodiment of the present disclosure presents a data processing apparatus for a neural network, the neural network provided with at least one activation function. The apparatus includes: a first converting unit, configured to convert, in response to that an activation function acquiring current data is a target function, based on a conversion relationship between the target function and a preset function, the current data into input data of the preset function; a finding unit, configured to find out first output data of the preset function with the input data as an input in a lookup table corresponding to the preset function; a second converting unit, configured to obtain second output data of the target function with the current data as an input by conversion based on the conversion relationship and the first output data; and an outputting unit, configured to output the second output data.

In some embodiments, the target function includes a sigmoid nonlinear function, and the preset function comprises a tank hyperbolic tangent function; and the first converting unit is configured to: determine a quotient of dividing the current data by two for use as the input data of the preset function.

In some embodiments, if the current data is a floating number, and the floating number takes an expression including a mantissa and an exponent with two as a base, then the first converting unit is further configured to: subtract one from the exponent of the current data to obtain the quotient of dividing the current data by two.

In some embodiments, the second converting unit is configured to: sum the first output data and one, and determine a quotient of dividing the sum by two for use as the second output data of the target function with the current data as the input.

In some embodiments, if the sum is a floating number, and the floating number takes an expression including a mantissa and an exponent with two as a base, then the second converting unit is further configured to: subtract one from the exponent of the sum to obtain the quotient of dividing the sum by two.

In some embodiments, the lookup table corresponding to the preset function includes at least one of a positive number input range or a negative number input range.

In some embodiments, the target function comprises a tank hyperbolic tangent function, and the preset function includes a sigmoid nonlinear function; and the first converting unit is further configured to: determine a product of multiplying the current data by two for use as the input data of the preset function.

In some embodiments, if the current data is a floating number, and the floating number takes an expression including a mantissa and an exponent with two as a base, then the first converting unit is further configured to: add one to the exponent of the current data to obtain the product of multiplying the current data by two.

In some embodiments, the second converting unit is further configured to: determine a product of multiplying the first output data by two, and use a difference of subtracting one from the product as the second output data of the target function with the current data as the input.

In some embodiments, if the first output data is a floating number, and the floating number takes an expression including a mantissa and an exponent with two as a base, then the second converting unit is further configured to: add one to the exponent of the first output data to obtain the product of multiplying the first output data by two.

In a third aspect, an embodiment of the present disclosure presents an artificial intelligence chip, including: a storing component, storing one or more programs thereon; a scheduling component, configured to perform instruction scheduling based on a to-be-executed instruction; at least one general purpose executing component, configured to receive an instruction sent by the scheduling component, execute a corresponding program; and/or generate a subinstruction based on the instruction sent by the scheduling component, and send the generated subinstruction to a corresponding special purpose executing component; and the at least one special purpose executing component, configured to receive the instruction sent by the at least one general purpose executing component, and execute a corresponding program, where one or more of the special purpose executing components, when executing the corresponding program, implement the method according to any one embodiment in the first aspect.

In a fourth aspect, an embodiment of the present disclosure presents a computer readable medium, storing a computer program thereon, where the computer program, when executed by an executing component, implements the method according to any one embodiment in the first aspect.

In a fifth aspect, an embodiment of the present disclosure presents an electronic device, including: a processor, a storage apparatus, and at least one the artificial intelligence chip according to the third aspect.

The data processing method and apparatus for a neural network presented in the embodiments of the present disclosure may convert, when determining that an activation function acquiring current data is a target function, based on a conversion relationship between the target function and a preset function, the current data into input data of the preset function. Then, first output data of the preset function with the input data as an input may be found out in a lookup table corresponding to the preset function. Then, second output data of the target function with the current data as an input may be obtained by conversion based on the conversion relationship and the first output data, and the second output data may be outputted. That is to say, the preset function is used to express the target function to avoid creating the corresponding lookup table for the target function, thereby contributing to reducing occupancy of the storage space. Moreover, when calculating different activation functions, changing the lookup tables may be reduced, thereby contributing to improving the overall processing performance.

BRIEF DESCRIPTION OF THE DRAWINGS

By reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
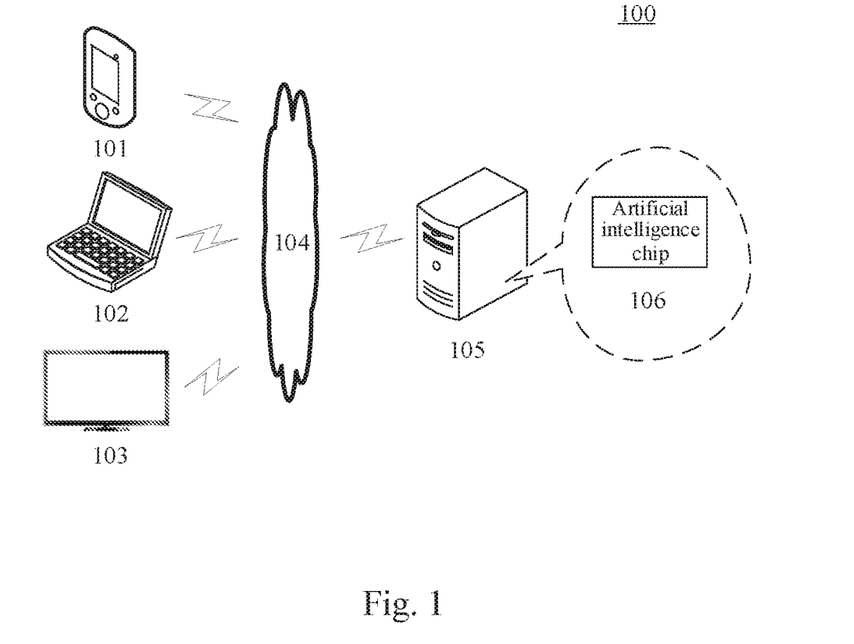
FIG. 1 is an architectural diagram of an exemplary system in which an embodiment of the present disclosure may be applied.

FIG. 1 shows an exemplary system architecture 100 in which a method and apparatus for data processing for a neural network of the embodiments of present disclosure may be implemented.

As shown in FIG. 1, the system architecture 100 may include terminals 101, 102 and 103, a network 104, and a server 105. The network 104 serves as a medium providing a communication link between the terminals 101, 102 and 103, and the server 105. The network 104 may include various types of connections, such as wired or wireless communication links, or optical fibers.

A user may interact with the server 105 using the terminals 101, 102 and 103 through the network 104, to receive or send messages, etc. The terminals 101, 102 and 103 may be provided with various client applications, such as model training and test applications, model prediction applications, web browsers, shopping applications, and instant messaging tools.

The terminals 101, 102 and 103 here may be hardware or software. When the terminals 101, 102 and 103 are hardware, the terminals may be various electronic devices having display screens, including but not limited to smart phones, tablet PCs, smart watches, e-book readers, MP3 (Moving Picture Experts Group Audio Layer III) players, laptop portable computers, desktop computers, and the like. When the terminals 101, 102 and 103 are software, the terminals maybe installed in the above-listed electronic devices. The terminals may be implemented as a plurality of software programs or software modules (e.g., software programs or software modules for providing distributed services), or as a single software program or software module. This is not specifically limited here.

The server 105 may be a server providing various services, such as a backend server providing support for various applications installed on the terminals 101, 102 and 103. The backend server may analyze and process operation behaviors of users on the applications, and return processing results (e.g., response information corresponding to the operation behaviors) to the terminals 101, 102 and 103.

In addition, the server 105 may be provided with an artificial intelligence chip 106. The artificial intelligence chip (AI chip) 106, also referred to as an AI accelerator or computing card, i.e., a module specially configured to process a large amount of computational tasks in artificial intelligence applications. For example, a CPU (Central Processing Unit) of the server 105 may transmit acquired training data and/or test data to the artificial intelligence chip 106 by a PCIE (Peripheral Component Interconnect Express). In this case, the artificial intelligence chip 106 may use these data for model training and/or testing. For another example, the CPU may transmit acquired to-be-analyzed data to the artificial intelligence chip 106. In this case, the artificial intelligence chip 106 may input the to-be-analyzed data into a trained model, to use the model for analysis.

Thus, the CPU may execute further processing and analysis based on the processing results (e.g., trained model data, model test result data, or model analysis result data) of the artificial intelligence chip 106. That is to say, other non-computational tasks may still be executed by the CPU of the server 105. It will be appreciated that replacing the CPU of the server 105 by the artificial intelligence chip 106 to implement a part of processing functionalities, which may reduce the work load of the CPU, thereby contributing to improving the overall processing performance of the server 105.

The server 105 here may also be hardware or software. When the server 105 is hardware, the server may be implemented as a distributed server cluster composed of a plurality of servers, or may be implemented as a single server. When the server 105 is software, the server may be implemented as a plurality of software programs or software modules (e.g., software programs or software modules for providing distributed services), or may be implemented as a single software program or software module. This is not specifically limited here.

It should be noted that the data processing method for a neural network provided in the embodiment of the present disclosure is generally executed by the artificial intelligence chip 106. Accordingly, the data processing apparatus for a neural network is generally provided in the artificial intelligence chip 106.

It should be understood that the numbers of terminals, networks, servers, and artificial intelligence chips in FIG. 1 are merely illustrative. Any number of terminals, networks, servers, and artificial intelligence chips may be provided based on actual requirements.

Figure 2:
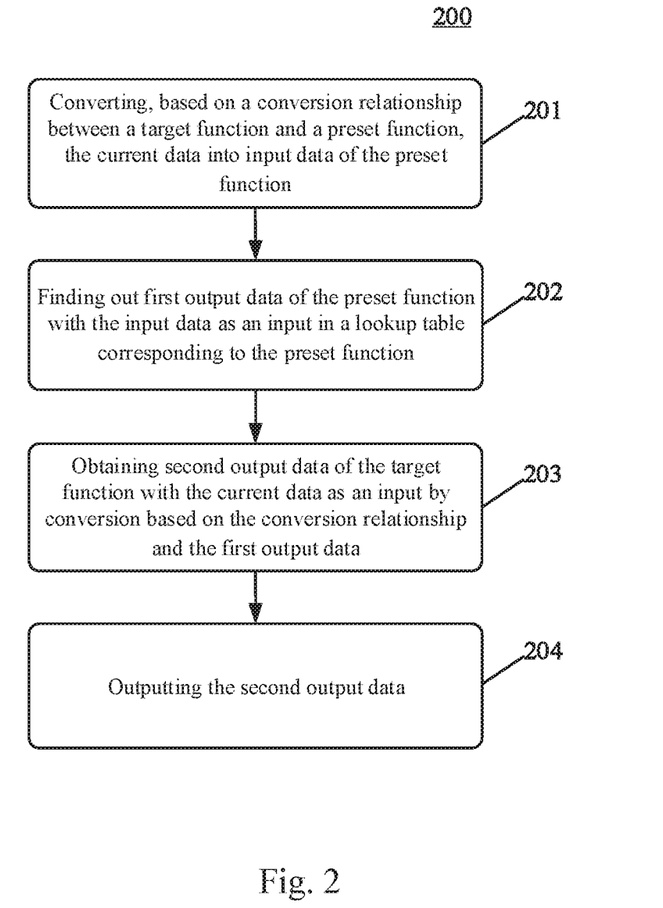
FIG. 2 is a flowchart of an embodiment of a data processing method for a neural network according to the present disclosure.

Further referring to FIG. 2, a process 200 of an embodiment of a data processing method for a neural network according to the present disclosure is shown. The data processing method for a neural network may include the following steps.

Step 201: converting, in response to that an activation function acquiring current data is a target function, based on a conversion relationship between the target function and a preset function, the current data into input data of the preset function.

In the present embodiment, an executing body (e.g., the artificial intelligence chip 106 shown in FIG. 1) of the data processing method for a neural network may receive or acquire data through wired connection or wireless connection. The executing body may train or test the neural network model stored thereon using these data. The executing body may also analyze and process these data using the neural network model stored thereon. The neural network model may be various existing learning models created based on machine learning technologies. The neural network model may have various existing neural network structures (e.g., DenseBox, VGGNet, ResNet, or SegNet). Moreover, the neural network model will generally be provided with at least one node (i.e., the activation function).

In the present embodiment, the executing body may determine whether the activation function acquiring the current data is the target function, that is, determining whether the activation function that needs to use the current data as an input is the target function. When determining that the activation function acquiring the current data is the target function, the current data may be converted into the input data of the preset function based on the conversion relationship between the target function and the preset function.

It will be appreciated that, when constructing the neural network model, the activation function used for each node is known. Thus, the executing body may determine whether the activation function of the node is the target function based on the node of the current data. Alternatively, the executing body may determine, according to relevant codes of an activation function in a currently running program, whether the activation function is the target function. Here, the current data may be initial input data of the neural network model, or input data of any node in the neural network model, i.e., output data of a previous node. The target function and the preset function may be any two activation functions used in the neural network model, for example, any two of nonlinear activation function sigmoid, tank (hyperbolic tangent), or relu (rectified linear unit). It should be noted that, when the target function and the preset function are determined, the conversion relationship between the two may be obtained by calculation, and is generally constant.

In some optional implementations of the present disclosure, the target function may be:

$$\tanh(x) = \frac{e^x - e^{-x}}{e^x + e^{-x}}.$$

The preset functions may be:

$$sigmoid(x) = \frac{1}{1 + e^{-x}}.$$

The conversion relationship between the two is:

$$\tanh(x) = \frac{e^x - e^{-x}}{e^x + e^{-x}} = \frac{1 - e^{-2x}}{1 + e^{-2x}} = \frac{2 - (1 + e^{-2x})}{1 + e^{-2x}} = \frac{2}{1 + e^{-2x}} - 1 = 2 \times sigmoid(2x) - 1.$$

Thus it can be seen that, the input data of the tanh(x) function are twice the input data of the sigmoid(x) function. In this case, a product of multiplying the current data by two is determined as the input data of the preset function.

It will be appreciated that data transmitted in a computer are generally a floating number. The floating number generally takes an expression including a mantissa and an exponent with two as a base. For example, $x = M \times 2^E$, where M represents a mantissa, maybe a positive number, or a negative number; and E represents an exponent. For another example, $x = (-1)^S \times M \times 2^E$, where S represents a sign bit, i.e., positive or negative. In this case, the mantissa M can only be a positive number.

Here, the executing body may directly calculate the product of multiplying the current data by two using a computational formula (e.g., floating number multiplication). However, this computing method is generally inefficient. In order to improve the data processing efficiency, as may be found by observation, for the product of multiplying the current data by two, the exponent of the current data may be increased by one. That is, the executing body may increase to the exponent of the current data by one to obtain the product of multiplying the current data by two. That is, the input data $2x = M \times 2^{E+1}$ or $(-1)^S \times M \times 2^{E+1}$ of the preset function are obtained by conversion from the current data x. Thus, a large number of computational processes may be reduced, thereby achieving efficient processing.

Step 202: finding out first output data of the preset function with the input data as an input in a lookup table corresponding to the preset function.

In the present embodiment, the executing body may find out the first output data of the preset function with the input data as the input in the lookup table corresponding to the stored preset function. Here, the lookup table may generally be used to describe an approximate output value of the activation function in an input range. That is, some points in a curve of the activation function are taken. A straight line may be obtained by connecting two neighboring points. Ordinate values of this straight line may be used to approximately replace function values with abscissas between the two points. Furthermore, in order to make an approximate value closest to the true value, generally more points need to be connected.

In the prior art, generally for each activation function, a lookup table corresponding to the activation function will be created. Calculation of the corresponding activation function is generally implemented using the lookup table. For example, the lookup table corresponding to a sigmoid function is often different from the lookup table corresponding to a tanh function. That is, a point with the input data as the abscissa is found out in the lookup table corresponding to the preset function, and the ordinate corresponding to the point is determined as the first output data.

Step 203: obtaining second output data of the target function with the current data as an input by conversion based on the conversion relationship and the first output data.

In the present embodiment, after obtaining the first output data, the executing body may obtain the second output data of the target function with the current data as the input by conversion based on the conversion relationship between the target function and the preset function.

In some optional implementations of the present embodiment, if the target function is the tanh function, and the preset function is the sigmoid function, then the executing body may determine a product of multiplying the first output data by two. A difference of subtracting one from the product may be used as the second output data of the target function with the current data as the input. That is $\tanh(x) = 2 \times sigmoid(2x) - 1$.

Here, the executing body may also obtain the second output data using a computational formula. Optionally, if the first output data are a floating number, and the floating number may take an expression including a mantissa and an exponent with two as a base, then the executing body may also add one to the exponent of the first output data to obtain the product of multiplying the first output data by two. Thus, the floating number multiplication may not be used, thereby contributing to improving the processing efficiency. Finally, the second output data of the target function are obtained by calculating the difference of subtracting one from the product using floating number subtraction.

Step 204: outputting the second output data.

In the present embodiment, the executing body may output the second output data based on the second output data of the target function obtained by conversion in step 203. The output here may include, but is not limited to, at least one of the following: storing the second output data; transmitting the second output data from a current node of the target function to a next node, i.e., using as input data of the activation function of the next node; or transmitting the second output data (e.g., as model output) to other electronic device (e.g., the server 105 shown in FIG. 1).

It should be noted that, in hardware design, each lookup table generally has only one read port. In actual running process, there will often be much parallel computing. This may cause a situation where several computation routes simultaneously need to read the lookup table. Therefore, a lookup table corresponding to each activation function needs to be stored at each node. Thus, much storage space of the memory will be occupied. The present disclosure may express the target function by the preset function with no need for creating and storing the lookup table of the target function. Especially, common activation functions are used as target functions, thereby saving much storage space. Moreover, when calculating different activation functions, using the common activation functions as the target functions may help to reduce or avoid changing the lookup tables, and contribute to improving the overall processing performance.

The data processing method for a neural network in the present embodiment may convert the current data into the input data of the preset function based on the conversion relationship between the target function and the preset function, when determining that the activation function acquiring the current data is the target function. Then, the first output data of the preset function with the input data as the input may be found out in a lookup table corresponding to the preset function. Then, the second output data of the target function with the current data as the input may be obtained by conversion based on the conversion relationship and the first output data, and the second output data may be outputted. That is to say, the preset function is used to express the target function to avoid creating the corresponding lookup table for the target function, thereby contributing to reducing occupancy of the storage space. Moreover, when calculating different activation functions, the process of changing the lookup tables may be reduced, thereby contributing to improving the overall processing performance.

Figure 3:
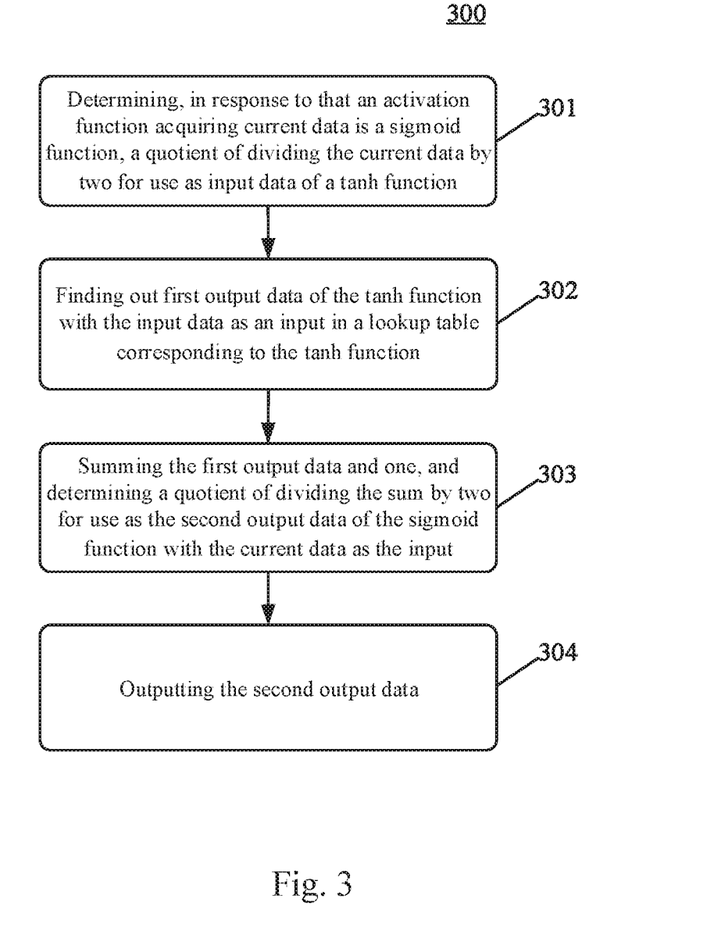
FIG. 3 is a flowchart of another embodiment of the data processing method for a neural network according to the present disclosure.

Referring to FIG. 3, a process 300 of another embodiment of the data processing method for a neural network according to the present disclosure is shown. The data processing method for a neural network may include the following steps.

Step 301: determining, in response to that an activation function acquiring current data is a sigmoid function, a quotient of dividing the current data by two for use as input data of a tanh function.

In the present embodiment, an executing body (e.g., the artificial intelligence chip 106 shown in FIG. 1) of the data processing method for a neural network may receive or acquire data through wired connection or wireless connection. The executing body may train or test the neural network model stored thereon using these data. The executing body may also analyze and process these data using the neural network model stored thereon. The neural network model may be various existing learning models created based on machine learning technologies. Moreover, the neural network model will generally be provided with at least one node (i.e., the activation function).

In the present embodiment, whether the activation function acquiring the current data is the sigmoid function may be determined. Moreover, when determining that the activation function acquiring the current data is the sigmoid function, the quotient of dividing the current data by two may be determined for use as the input data of the tanh function. In this case, the conversion relationship between the two is:

$$sigmoid(x) = \frac{1 + \tanh(x/2)}{2}.$$

Here, the executing body may directly determine the quotient using a computational formula. For example, if the current data is a floating number, and the floating number may take an expression including a mantissa and an exponent with two as a base, that is, the executing body may record the floating number using this expression approach.

Then the executing body may subtract one from the exponent of the current data to quickly obtain the quotient of dividing the current data by two. That is $x/2 = M \times 2^{E-1}$ or $(-1)^S \times M \times 2^{E-1}$. Thus, division operation of the floating number may be avoided to further improve the processing efficiency.

Step 302: finding out first output data of the tanh function with the input data as an input in a lookup table corresponding to the tanh function.

In the present embodiment, the executing body may find out the first output data of the tanh function with the input data as the input in the lookup table corresponding to the tanh function. Relevant description of step 202 in the embodiment of FIG. 2 may be referred to. The description will not be repeated here.

It will be appreciated that output of the tanh function is zero-centered, and is within a range of −1 to 1. That is, the tanh function is zero-symmetric, i.e., tanh(−x)=−tanh(x). Thus it can be seen that, the lookup table of the tanh function may be implemented without a complete lookup table. In this case, the lookup table corresponding to the tanh function may include at least one of a positive number input range or a negative number input range. Therefore, in order to further save the storage space, the executing body may store only a positive number portion (or a negative number portion) of the lookup table. The negative number portion (or the positive number portion) may be obtained by computation based on the positive number portion (or negative number portion).

Step 303: Summing the first output data and one, and determining a quotient of dividing the sum by two for use as the second output data of the sigmoid function with the current data as the input.

In the present embodiment, the executing body may sum the first output data obtained in step 302 and one, and may divide the sum by two to use the quotient as the second output data of the sigmoid function with the current data as the input. Here, if the sum is a floating number, and the floating number may take an expression including a mantissa and an exponent with two as a base, then the executing body may first obtain the sum using addition operation of the floating number. Then, one may be subtracted from the exponent of the sum to obtain the quotient of dividing the sum by two. Thus, division operation of the floating number may be avoided to further improve the processing efficiency.

Step 304: outputting the second output data.

In the present embodiment, when determining the second output data of the sigmoid function with the current data as the input, the executing body may output the second output data. Relevant description of step 204 in the embodiment of FIG. 2 may be referred to. The description will not be repeated here.

The data processing method for a neural network in the present embodiment may express the common sigmoid activation function with the common tanh activation function. Thus, not only much storage space may be saved, but also the two common activation functions may be calculated with no need for changing the lookup tables, thereby greatly reducing the iteration of changing the lookup tables, and contributing to significantly improving the processing performance. In addition, due to its own characteristics, the tanh activation function may store only the positive number portion or the negative number portion of the lookup table. Thus, occupancy of the storage space may be further reduced.

Figure 4:
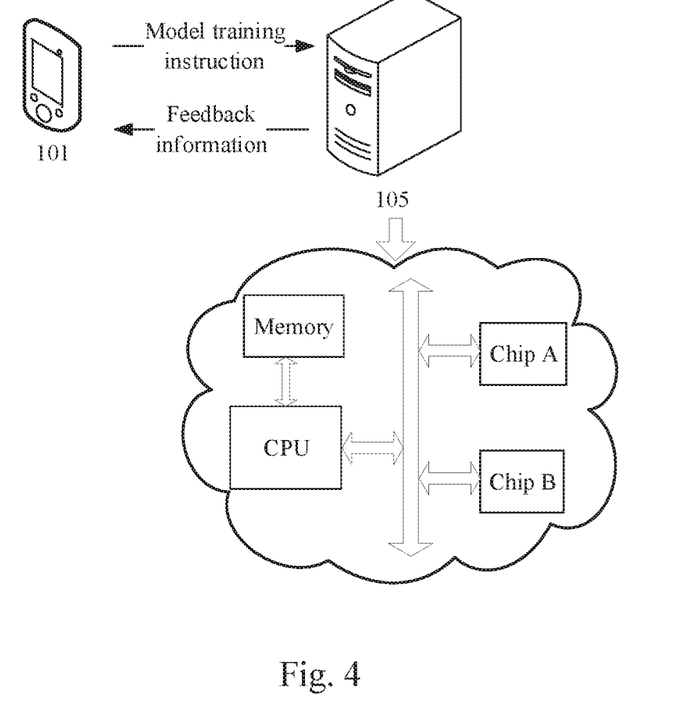
FIG. 4 is a schematic diagram of an application scenario of the data processing method for a neural network according to the present disclosure.

Further referring to FIG. 4, FIG. 4 is a schematic diagram of an application scenario of the data processing method for a neural network according to the above embodiments. In the application scenario of FIG. 4, the server 105 may be provided with an artificial intelligence chip A and an artificial intelligence chip B. The artificial intelligence chip A may be mainly used for data processing related to training and testing of a neural network model. The artificial intelligence chip B may be mainly used for data processing related to prediction and analysis of the neural network model.

Here, a user may send a model training instruction to the server 105 using the terminal 101. After receiving the instruction, the CPU in the server 105 may acquire training data and model data from a local memory, and transmit the acquired data to the artificial intelligence chip A. It should be noted that, the CPU may also acquire the above data from other devices, such as the cloud. Alternatively, these data may also be stored in the artificial intelligence chip A. Thus, after receiving the model training instruction sent from the terminal 101, the CPU may send a corresponding instruction to the artificial intelligence chip A.

In this case, the artificial intelligence chip A may train the model using the training data. In the training process, the data processing method for a neural network includes the following steps.

First, if an activation function acquiring current data is a target function, then based on a conversion relationship between the target function and a preset function, the current data may be converted into input data of the preset function; then, first output data of the preset function with the input data as an input may be found out in a lookup table corresponding to the preset function; then second output data of the target function with the current data as an input may be obtained by conversion based on the conversion relationship and the first output data; and then the second output data may be used as the current data, and outputted to an activation function of a next node, until the model training is completed.

Thus, the CPU may store the trained model in the memory or the artificial intelligence chip B. Moreover, the server 105 may send feedback information for describing the training results to the terminal 101. The feedback information may include at least one of the following items: model training completion, storage location of trained model, model training failure, error cause, or fault location, or the like.

In the present application scenario, the CPU in the server is replaced with the artificial intelligence chip to perform model training, which may reduce the CPU load. Moreover, the artificial intelligence chip helps to improve the model training efficiency using the data processing method for a neural network in the above embodiments. Thus, the overall performance of the server may be improved, and the waiting time duration of users may be reduced, thereby improving the user experience.

Figure 5:
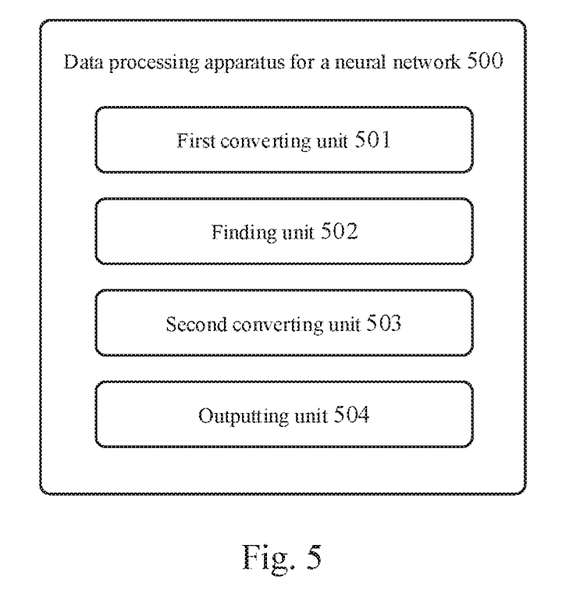
FIG. 5 is a schematic structural diagram of an embodiment of a data processing apparatus for a neural network according to the present disclosure.

Further referring to FIG. 5, as an implementation of the method shown in the above figures, the present disclosure provides an embodiment of a data processing apparatus for a neural network. The embodiment of the apparatus corresponds to the embodiments of the method shown in the above embodiments, and the apparatus may be specifically applied to various electronic devices.

As shown in FIG. 5, the data processing apparatus 500 for a neural network of the present embodiment may include: a first converting unit 501, configured to convert, in response to that an activation function acquiring current data is a target function, based on a conversion relationship between the target function and a preset function, the current data into input data of the preset function; a finding unit 502, configured to find out first output data of the preset function with the input data as an input in a lookup table corresponding to the preset function; a second converting unit 503, configured to obtain second output data of the target function with the current data as an input by conversion based on the conversion relationship and the first output data; and an outputting unit 504, configured to output the second output data. Where the neural network is provided with at least one activation function.

In some optional implementations of the present embodiment, the target function may include a sigmoid nonlinear function, and the preset function may include a tanh hyperbolic tangent function; and the first converting unit 501 may be configured to: determine a quotient of dividing the current data by two for use as the input data of the preset function.

Optionally, if the current data is a floating number, and the floating number may take an expression including a mantissa and an exponent with two as a base, then the first converting unit 501 may be further configured to: subtract one from the exponent of the current data to obtain the quotient of dividing the current data by two.

In some embodiments, the second converting unit 503 may be configured to: sum the first output data and one, and determine a quotient of dividing the sum by two for use as the second output data of the target function with the current data as the input.

Further, if the sum is a floating number, and the floating number may take an expression including a mantissa and an exponent with two as a base, then the second converting unit 503 may be further configured to: subtract one from the exponent of the sum to obtain the quotient of dividing the sum by two.

As an example, the lookup table corresponding to the preset function may include at least one of a positive number input range or a negative number input range.

In some application scenarios, the target function may include a tanh hyperbolic tangent function, and the preset function may include a sigmoid nonlinear function; and the first converting unit 501 may be further configured to: determine a product of multiplying the current data by two for use as the input data of the preset function.

Optionally, if the current data is a floating number, and the floating number may take an expression including a mantissa and an exponent with two as a base, then the first converting unit 501 may be further configured to: add one to the exponent of the current data to obtain the product of multiplying the current data by two.

In some embodiments, the second converting unit 503 may be further configured to: determine a product of multiplying the first output data by two, and use a difference of subtracting one from the product as the second output data of the target function with the current data as the input.

Further, if the first output data is a floating number, and the floating number may take an expression including a mantissa and an exponent with two as a base, then the second converting unit 503 may be further configured to: add one to the exponent of the first output data to obtain the product of multiplying the first output data by two.

It should be understood that the units disclosed in the apparatus 500 correspond to the steps in the method described in FIG. 2 and FIG. 3. Therefore, the operations, characteristics, and resulting beneficial effects described above for the method also apply to the apparatus 500 and the units included therein. The description will not be repeated here.

Figure 6:
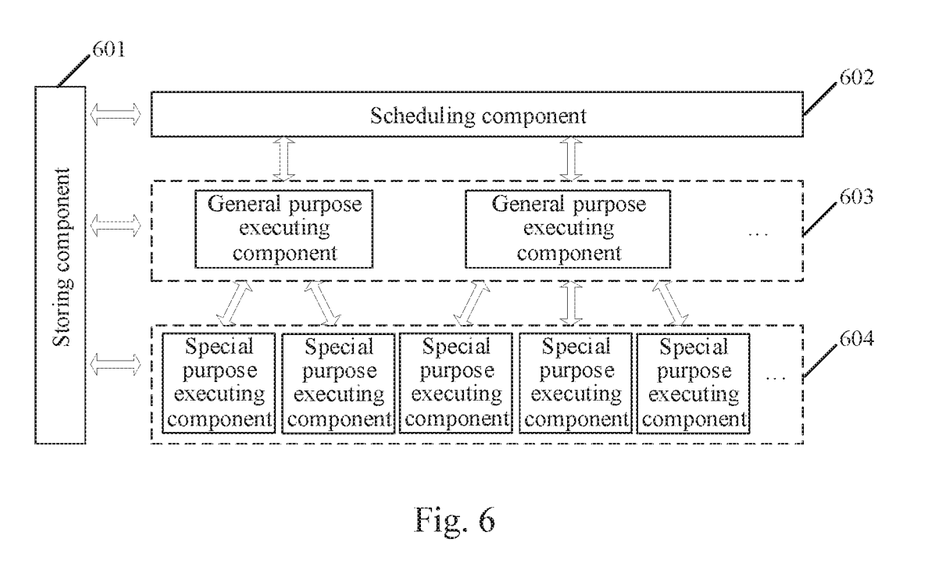
FIG. 6 is a schematic structural diagram of an embodiment of an artificial intelligence chip according to the present disclosure.

An embodiment of the present disclosure further presents an artificial intelligence chip. FIG. 6 maybe referred to for a structure of the artificial intelligence chip. A schematic structural diagram of an embodiment of the artificial intelligence chip of the present disclosure is shown. As shown in FIG. 6, the artificial intelligence chip in the present embodiment may include a storing component 601, a scheduling component 602, at least one general purpose executing component 603, and at least one special purpose executing component 604.

In the present embodiment, the storing component 601 may be a circuit or element capable of implementing an information storage functionality. For example, the storing component 601 may be a static random-access memory (SRAM), a random access memory (RAM), a memory bank, a secure digital memory card (SD card), or a flash memory card (TF card, also known as microSD), or the like. The storing component 601 may store one or more programs.

The scheduling component 602 maybe a circuit or element capable of implementing an instruction scheduling and distributing functionality. The scheduling component 602 may parse a to-be-executed instruction to determine what operation is to be executed, i.e., what to do. Then, the to-be-executed instruction may be sent to a corresponding general purpose executing component 603, i.e., a general purpose executing component 603 capable of executing an operation indicated by the to-be-executed instruction. The scheduling component 602 may be provided in a processor, or be standalone.

It should be noted that the to-be-executed instruction may be sent to the artificial intelligence chip by other electronic devices or electronic elements (e.g., the CPU in the server 105 shown in FIG. 1), or be generated by the artificial intelligence chip based on to-be-processed data. For example, a to-be-executed instruction for representing to execute the data processing method described in the above embodiments is generated when determining that the activation function acquiring the current data is the target function.

The general purpose executing component 603 may be a circuit or element capable of implementing a common operating functionality. Here, the common operating functionality may include, but is not limited to, algorithms that will often be used in artificial intelligence applications, such as a forward propagation algorithm, and a backpropagation algorithm. Thus, a user may combine the general purpose executing components 603 based on desired operating functionalities, thereby contributing to reducing the development period and development cost of the chip.

The common operating functionalities here may also include the instruction scheduling and distributing functionality. That is, the general purpose executing component 603 may also parse an instruction (i.e., the to-be-executed instruction) sent by the scheduling component 602. Then, at least one subinstruction may be generated based on the parsing result. Moreover, the generated at least one subinstruction may be sent to a corresponding special purpose executing component 604, respectively. Here, if a special purpose executing component 604 may implement the operation indicated by the to-be-executed instruction, then the general purpose executing component 603 may use the to-be-executed instruction as a subinstruction. If the operation indicated by the to-be-executed instruction may only be implemented by a plurality of special purpose executing components 604, then the general purpose executing component 603 may generate a plurality of subinstructions.

That is, the general purpose executing component 603 may not only independently complete executing the corresponding operation, but also assist the scheduling component 602 in instruction scheduling, thus contributing to reducing the work load of the scheduling component 602, and improving the overall processing efficiency of the chip.

In the present embodiment, the special purpose executing component 604 may be a circuit or element capable of implementing a specified operating functionality. Here, the so-called specified operating functionality maybe relative to a common operating function, that is, may include algorithms that are not commonly used in artificial intelligence applications, such as the method for data processing described in the above embodiments. Therefore, the special purpose executing component 604 is often designed according to different user needs.

Optionally, at least one special purpose executing component 604 may be obtained by splitting common operating functionalities that may be implemented by the general purpose executing assemblies 603, and by design according to the split operating functionalities. In this case, each general purpose executing component 603 may be communicatively connected to each special purpose executing component 604. Thus, by combining different special purpose executing components 604, more operating functionalities may be implemented, thereby contributing to reducing the number of executing components.

It should be noted that the artificial intelligence chip may be provided with one or more storing components 601, and store programs and other data required by other components thereon. In this case, the scheduling component 602, the general purpose executing component 603, and the special purpose executing component 604 may read data such as the programs from the storing component 601 through a serial bus, a data interface, or the like.

In some application scenarios, in order to improve the data processing efficiency, the scheduling component 602, the general purpose executing component 603, and the special purpose executing component 604 may also be provided with a storing component 601, respectively. Moreover, the storing components 601 in different components may store data required by the corresponding component. For example, the storing component 601 in the scheduling component 602 may store an instruction scheduling program.

The artificial intelligence chip in the present embodiment may meet the requirements for highly intensive computation, access and storage for deep learning, training and prediction, thereby improving the processing performance of a general purpose processor, such as the traditional CPU, or GPU, in a deep learning scenario. Moreover, the data processing method in deep learning is optimized, which helps to improve the overall executing efficiency of software and hardware.

In addition, the units involved in the embodiments of the present disclosure may be implemented by means of software or hardware. The described units may also be provided in an executing component, for example, described as: an executing component including a first converting unit, a finding unit, a second converting unit, and an outputting unit. The names of the units do not constitute a limitation to such units themselves in some cases. For example, the outputting unit may also be described as "a unit for outputting second output data."

In another aspect, the present disclosure further provides a computer readable medium. The computer readable medium may be included in the artificial intelligence chip in the above described embodiments, or a stand-alone computer readable medium without being assembled into the artificial intelligence chip. The computer readable medium stores one or more programs. The one or more programs, when executed by the artificial intelligence chip, cause the artificial intelligence chip to: convert, in response to that an activation function acquiring current data is a target function, based on a conversion relationship between the target function and a preset function, the current data into input data of the preset function; find out first output data of the preset function with the input data as an input in a lookup table corresponding to the preset function; obtain second output data of the target function with the current data as an input by conversion based on the conversion relationship and the first output data; and output the second output data.

It should be noted that the computer readable medium of the present disclosure may be a computer readable signal medium or a computer readable storage medium or any combination of the above two. An example of the computer readable storage medium may include, but is not limited to: an electric, magnetic, optical, electromagnetic, infrared, or semiconductor system, apparatus, element, or a combination of any of the above. A more specific example of the computer readable storage medium may include, but is not limited to: electrical connection with one or more wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable medium may be any tangible medium containing or storing programs, which may be used by a command execution system, apparatus or element, or incorporated thereto. In the present disclosure, the computer readable signal medium may include a data signal in the base band or propagating as a part of a carrier wave, in which computer readable program codes are carried. The propagating data signal may take various forms, including but not limited to: an electromagnetic signal, an optical signal or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

Figure 7:
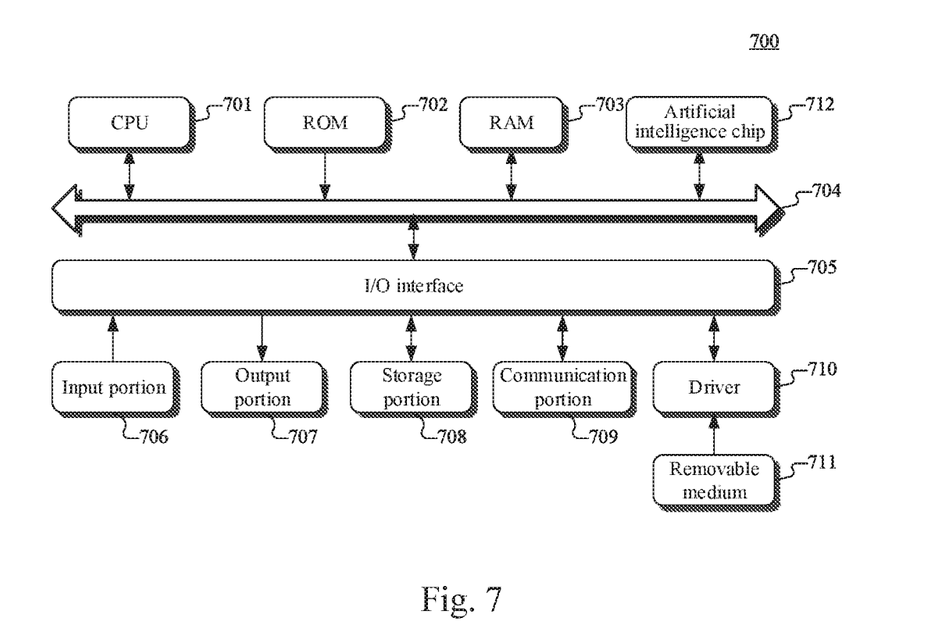
FIG. 7 is a schematic structural diagram of a computer system adapted to implement an electronic device of the embodiments of the present disclosure.

Referring to FIG. 7 below, a schematic structural diagram of a computer system 700 adapted to implement an electronic device (e.g., the terminals 101, 102 and 103 or the server 105 shown in FIG. 1) of the embodiments of the present disclosure is shown. The electronic device shown in FIG. 7 is merely an example, and should not limit the functionalities and scope of use of the embodiments of the present disclosure.

As shown in FIG. 7, the computer system 700 includes a central processing unit (CPU) 701, which may execute various appropriate actions and processes in accordance with a program stored in a read only memory (ROM) 702 or a program loaded into a random access memory (RAM) 703 from a storage portion 708. The RAM 703 also stores various programs and data required by operations of the system 700. The CPU 701 may also perform data processing and analysis by an artificial intelligence chip 712. The CPU 701, the ROM 702, the RAM 703, and the artificial intelligence chip 712 are connected to each other through a bus 704. An input/output (I/O) interface 705 is also connected to the bus 704.

The following components are connected to the I/O interface 705: an input portion 706 including a touch screen, a key, a mouse, a microphone, a camera, or the like; an output portion 707 including a cathode ray tube (CRT), a liquid crystal display device (LCD), a speaker, or the like; a storage portion 708 including a hard disk, or the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, so that a computer program read therefrom is installed on the storage portion 708 as needed.

In particular, according to the embodiments of the present disclosure, the process described above with reference to the flow chart may be implemented in a computer software program. For example, an embodiment of the present disclosure may include a computer program product, which includes a computer program that is tangibly embedded in a computer readable medium. The computer program includes program codes for executing the method as illustrated in the flow chart. In such an embodiment, the computer program may be downloaded and installed from a network via the communication portion 709, and/or may be installed from the removable medium 711. The computer program, when executed by the artificial intelligence chip 712, implements the above functions as defined by the method of the present disclosure.

It should be understood that the flowcharts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flow charts as well as a combination of blocks may be implemented using a special purpose hardware-based system executing specified functions or operations, or by a combination of a special purpose hardware and computer instructions.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functionalities disclosed in the present disclosure.

What is claimed is:

1. A data processing method for a neural network, the neural network provided with at least two activation functions, the method comprising:
   determining a first activation function from the at least two activation functions, the first activation function being an activation function that needs to use current data as an input, and determining whether the first activation function is a target function of a preset type, wherein the neural network stores a lookup table corresponding to a part of the at least two activation functions;
   in response to that a first lookup table corresponding to the first activation function is not included in the stored lookup table, determining that the first activation function is the target function, and converting, based on a conversion relationship between the target function and a preset function, the current data into input data of the preset function;
   finding out first output data of the preset function with the input data as an input in a lookup table corresponding to the preset function, wherein the lookup table corresponding to the preset function is included in the stored lookup table;
   obtaining second output data of the target function with the current data as an input by conversion based on the conversion relationship and the first output data; and
   outputting the second output data;
   wherein the method is performed by an artificial intelligence (AI) chip, and the AI chip is provided in a server.

2. The method according to claim 1, wherein the target function comprises a sigmoid nonlinear function, and the preset function comprises a tanh hyperbolic tangent function; and
   the converting, based on a conversion relationship between the target function and a preset function, the current data into input data of the preset function comprises:
   determining a quotient of dividing the current data by two for use as the input data of the preset function.

3. The method according to claim 2, wherein if the current data is a floating number, and the floating number takes an expression including a mantissa and an exponent with two as a base, then the determining a quotient of dividing the current data by two comprises:
   subtracting one from the exponent of the current data to obtain the quotient of dividing the current data by two.

4. The method according to claim 2, wherein the obtaining second output data of the target function with the current data as an input by conversion based on the conversion relationship and the first output data comprises:
   summing the first output data and one, and determining a quotient of dividing the sum by two for use as the second output data of the target function with the current data as the input.

5. The method according to claim 4, wherein if the sum is a floating number, and the floating number takes an expression including a mantissa and an exponent with two as a base, then the determining a quotient of dividing the sum by two comprises:
   subtracting one from the exponent of the sum to obtain the quotient of dividing the sum by two.

6. The method according to claim 2, wherein the lookup table corresponding to the preset function comprises at least one of a positive number input range or a negative number input range.

7. The method according to claim 1, wherein the target function comprises a tanh hyperbolic tangent function, and the preset function comprises a sigmoid nonlinear function; and
   the converting, based on a conversion relationship between the target function and a preset function, the current data into input data of the preset function comprises:
   determining a product of multiplying the current data by two for use as the input data of the preset function.

8. The method according to claim 7, wherein if the current data is a floating number, and the floating number takes an expression including a mantissa and an exponent with two as a base, then the determining a product of multiplying the current data by two comprises:
   adding one to the exponent of the current data to obtain the product of multiplying the current data by two.

9. The method according to claim 7, wherein the obtaining second output data of the target function with the current data as an input by conversion based on the conversion relationship and the first output data comprises:
   determining a product of multiplying the first output data by two, and using a difference of subtracting one from the product as the second output data of the target function with the current data as the input.

10. The method according to claim 9, wherein if the first output data is a floating number, and the floating number takes an expression including a mantissa and an exponent with two as a base, then the determining a product of multiplying the first output data by two comprises:
    adding one to the exponent of the first output data to obtain the product of multiplying the first output data by two.

11. A data processing apparatus for a neural network, the neural network provided with at least two activation functions, the apparatus comprising:
    at least one processor; and
    a memory storing instructions, wherein the instructions when executed by the at least one processor, cause the at least one processor to perform operations, the operations comprising:
    determining a first activation function from the at least two activation functions, the first activation function being an activation function that needs to use current data as an input, and determining whether the first activation function is a target function of a preset type, wherein the neural network stores a lookup table corresponding to a part of the at least two activation functions;
    in response to that a first lookup table corresponding to the first activation function is not included in the stored lookup table, determining that the first activation function is the target function, and converting, based on a conversion relationship between the target function and a preset function, the current data into input data of the preset function;
    finding out first output data of the preset function with the input data as an input in a lookup table corresponding to the preset function, wherein the lookup table corresponding to the preset function is included in the stored lookup table;

obtaining second output data of the target function with the current data as an input by conversion based on the conversion relationship and the first output data; and outputting the second output data.

12. The apparatus according to claim 11, wherein the target function comprises a sigmoid nonlinear function, and the preset function comprises a tanh hyperbolic tangent function; and the converting, based on a conversion relationship between the target function and a preset function, the current data into input data of the preset function comprises:

determining a quotient of dividing the current data by two for use as the input data of the preset function.

13. The apparatus according to claim 12, wherein if the current data is a floating number, and the floating number takes an expression including a mantissa and an exponent with two as a base, then the determining a quotient of dividing the current data by two comprises:

subtracting one from the exponent of the current data to obtain the quotient of dividing the current data by two.

14. The apparatus according to claim 12, wherein the obtaining second output data of the target function with the current data as an input by conversion based on the conversion relationship and the first output data comprises:

summing the first output data and one, and determining a quotient of dividing the sum by two for use as the second output data of the target function with the current data as the input.

15. The apparatus according to claim 14, wherein if the sum is a floating number, and the floating number takes an expression including a mantissa and an exponent with two as a base, then the determining a quotient of dividing the sum by two comprises:

subtracting one from the exponent of the sum to obtain the quotient of dividing the sum by two.

16. The apparatus according to claim 12, wherein the lookup table corresponding to the preset function comprises at least one of a positive number input range or a negative number input range.

17. An artificial intelligent chip, comprising:

a storing component, storing one or more programs thereon;

a scheduling component, configured to perform instruction scheduling based on a to-be-executed instruction;

at least one general purpose executing component, configured to receive an instruction sent by the scheduling component, execute a corresponding program; and/or generate a subinstruction based on the instruction sent by the scheduling component, and send the generated subinstruction to a corresponding special purpose executing component; and at least one special purpose executing component, configured to receive the subinstruction sent by the at least one general purpose executing component, and execute a corresponding program, wherein one or more of the special purpose executing assemblies, when executing the corresponding program, implement the method according to claim 1.

18. A non-transitory computer readable medium, storing a computer program thereon, wherein the computer program, when executed by an executing component, implements the method according to claim 1.

19. An electronic device, comprising: a processor, a storage apparatus, and at least one the artificial intelligence chip according to claim 17.

\* \* \* \* \*